United States Patent [19]

Saito

[11] Patent Number: 4,540,996

[45] Date of Patent: Sep. 10, 1985

[54] RECORDING APPARATUS

[75] Inventor: Seiji Saito, Yokosuka, Japan

[73] Assignee: Canon Kabushiki Kaisha, Tokyo, Japan

[21] Appl. No.: 490,432

[22] Filed: May 2, 1983

[30] Foreign Application Priority Data

May 11, 1982 [JP] Japan ................................. 57-77428
May 11, 1982 [JP] Japan ................................. 57-77432
May 11, 1982 [JP] Japan ................................. 57-77434

[51] Int. Cl.$^3$ ............................................. G01D 15/18
[52] U.S. Cl. .................... 346/140 R; 346/75; 358/75
[58] Field of Search .............. 346/140, 75, 46; 358/75, 78

[56] References Cited

U.S. PATENT DOCUMENTS 4,232,324 11/1980 Tsao ..................... 346/75
4,320,406 3/1982 Heinzl ................... 346/140
4,401,991 8/1983 Martin ................... 346/75
4,413,275 11/1983 Horiuchi ................ 358/75

Primary Examiner—Joseph W. Hartary
Attorney, Agent, or Firm—Fitzpatrick, Cella, Harper & Scinto

[57] ABSTRACT

A recording apparatus has M different color recording heads (i.e., M columns) which are disposed parallel to each other such that they extend perpendicularly to a main scanning direction and such that two adjacent recording heads are spaced apart by an L-dot interval from each other. At the same time, the M recording heads are offset from each other by l-dot intervals. Each recording head has N nozzles which are spaced apart by K-dot intervals from each other along the subscanning direction. The recording apparatus satisfies either the inequality $lM \leq K$ (where K/N is an irreducible fraction) or inequalities $lM > K$ and $K(N-1)+1 > l$ (where K/l is an irreducible fraction), thereby preventing double recording (so that only a single nozzle injects an ink onto a single point on a recording paper sheet) and omissions.

11 Claims, 13 Drawing Figures

RECORDING APPARATUS

BACKGROUND OF THE INVENTION

1. Field of the Invention

The present invention relates to a recording apparatus for forming an image on a recording paper sheet in accordance with a dot (pixel) matrix of recording dots of a thermal printer, an ink jet printer or the like.

2. Description of the Prior Art

A recording apparatus has been recently proposed wherein recording means are arranged in a matrix so as to achieve high-speed recording when high speed recording by individual recording means cannot be performed in a recording system such as an ink jet on-demand recording system.

FIG. 1 shows an example of a recording head unit 1 of a multicolor ink jet recording apparatus of this type. Recording heads 2Y, 2M, 2C and 2BK for respectively injecting yellow, magenta, cyan, and black inks are arranged along a main scanning direction (indicated by arrow X) in the recording head unit 1. Each recording head has three nozzles disposed along a subscanning direction (indicated by arrow Y) thereof. The recoreding heas unit 1 which thus comprises a three-row x four-column matrix is moved along the direction indicated by X so as to perform main scanning and, at the same time, subscanning with a predetermined jump, thereby forming a multicolor image on the recording paper sheet.

However, in a recording apparatus for forming a multicolor image by injecting different color inks from a plurality of recording heads at a single position on the recording paper sheet, smearing occurs at the single position when an ink is injected before the previously injected ink is completely dried, resulting in degradation of image quality. In order to eliminate this drawback, an interval between two adjacent recording heads must be sufficiently wide. However, the interval often cannot be wide enough due to limitations on the arrangement of the recording head unit. As a result, the advantages of a dot matrix arrangement, such as high-speed recording and high-resolution recording, cannot be sufficiently realized in the multicolor recording apparatus.

SUMMARY OF THE INVENTION

The present invention has been made in consideration of the conventional drawback and has for its object to provide a recording apparatus for performing image recording with high image quality at a high speed.

It is another object of the present invention to provide a recording apparatus for performing image recording without double recording or omissions.

It is still another object of the present invention to provide a recording apparatus for performing image recording so as to coincide a forward recording order with a backward recording order of each recording means for injecting a predetermined color ink.

It is still another object of the present H; invention to provide a recording apparatus having a plurality of recording means offset from each other at predetermined intervals so as to prevent double recording and omissions.

Other objects, features and advantages of the present invention will be apparent from the following detailed description when taken with reference to the accompanying drawings.

DETAILED DESCRIPTION OF THE PREFERRED EMBODIMENTS

Figure 2:
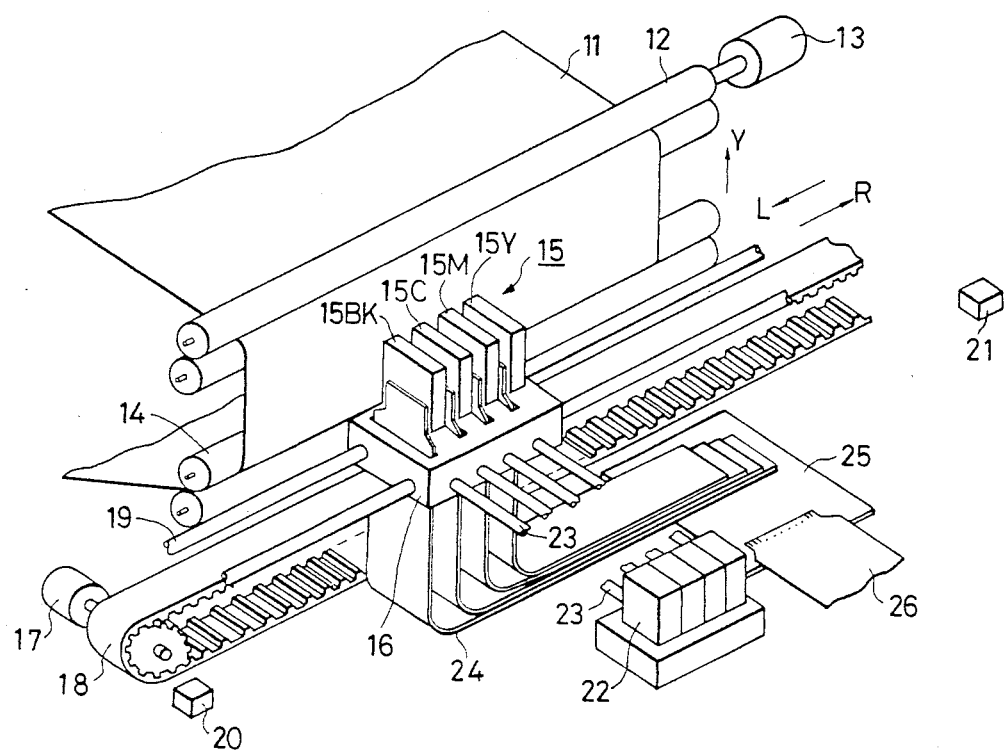
FIG. 2 is a perspective view of a recording apparatus according to an embodiment of the present invention.

Recording apparatuses according to preferred embodiments of the present invention will be described with reference to the accompanying drawings. FIG. 2 shows a multicolor ink jet printer to which the present invention is applied. Paper feed rollers 12 feed a recording paper sheet 11 in a direction indicated by arrow Y. A pulse motor 13 drives the paper feed rollers 12 such that one of the paper feed rollers 12 is directly coupled to the pulse motor 13. Paper guide rollers 14 guide the recording paper sheet 11. A multinozzle ink jet head unit or a recording head unit 15 which opposes the recording paper sheet 11 is moved along the width of the recording paper sheet 11. The multinozzle ink jet head unit 15 comprises a yellow (Y) recording head 15Y, a magenta (M) recording head 15M, a cyan (C) recording head 15C, and a black (BK) recording head 15BK.

Figure 1:
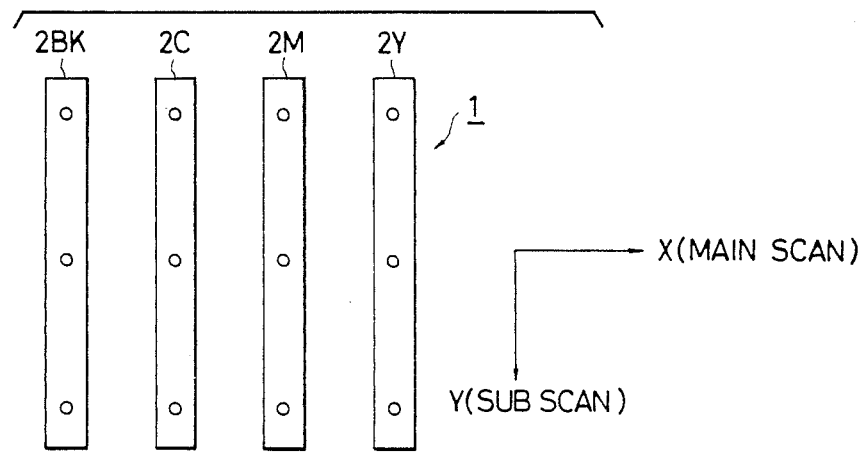
FIG. 1 shows a conventional recording head.
Figure 3:
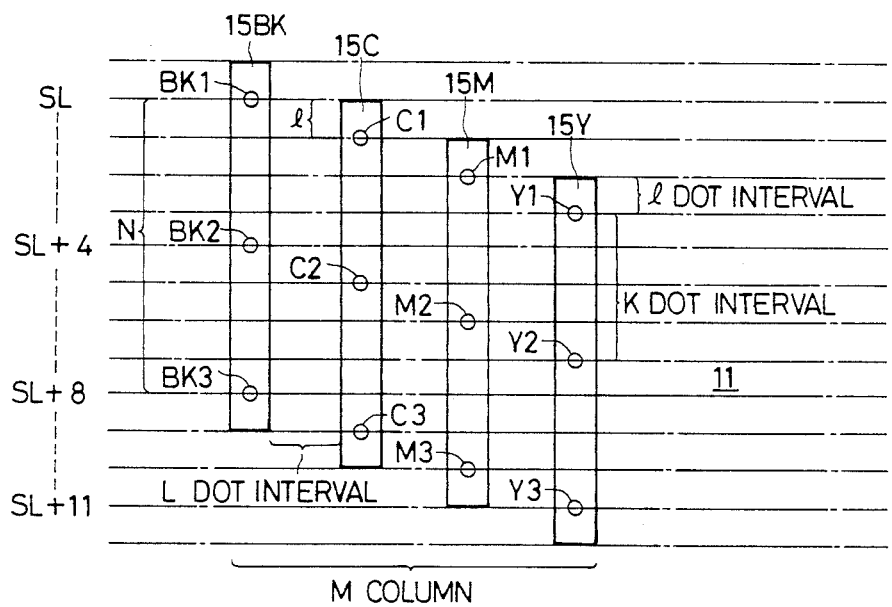
FIG. 3 shows a configuration of a recording head unit shown in FIG. 2.

As shown in FIG. 3, each recording head has N nozzles which are disposed at K-dot intervals along a subscanning direction, and M columns of recording heads are disposed along a main scanning direction at L-dot intervals. (One "dot interval" defines a basic resolution element for the image being formed, which can be seen in FIG. 4.) Adjacent recording heads are offset from each other by an interval l along the subscanning direction. K, l, M and N are determined to satisfy one of inequalities (1) and (2) below:

$$lM \leqq K \tag{1}$$

$$\left.\begin{array}{l} lM > K \\ K(N-1) + 1 > l \\ \text{for } K/l \text{ (irreducible fraction)} \end{array}\right\} \tag{2}$$

More particularly, the recording head unit of this embodiment 15 is illustrated in FIG. 3. Each of the four recording heads 15Y to 15BK (M=4) has three nozzles (N=3) along the subscanning direction (vertical direction in the figure) at four-dot intervals (K=4). The recording heads 15Y to 15BK are sequentially shifted by two-dot intervals (L=2) in the main scanning direction (left to right). As shown in FIG. 3, the recording heads 15BK to 15Y are sequentially offset by one-dot intervals (l=1) from the upper to the lower direction. In this manner, K, l, M and N are 4, 1, 4 and 3, respectively. Therefore, $$lM=4=K$$

The above conditions satisfy inequality (1). The alternate long and short dashed lines in FIG. 3 indicate main scanning lines of the recording heads 15Y to 15BK. Each of the recording heads 15Y, 15M, 15C and 15BK injects an ink every time a pressure pulse is applied thereto, in accordance with the on-demand system. Alternatively, the recording head injects an ink with a bubble every time a heating element embedded in the head is heated, in accordance with the bubble jet system.

Referring again to FIG. 2, a carriage unit 16 which carries the ink jet head unit 15 reciprocates along the directions indicated by arrows L and R. A head feed pulse motor 17 drives the carriage unit 16 through a timing belt 18. Guide rails 19 guide the carriage unit 16. Position sensors 20 and 21 detect the displaced position of the head unit 15. Different color inks are supplied from respective ink tanks 22 to the recording heads 15Y, 15M, 15C and 15BK through ink supply pipes 23, respectively. Flexible wiring boards (power supply cables) 24 supply drive signals to the heads 15Y, 15M, 15C and 15BK, respectively. A terminal block 25 connects the flexible power supply cables 24 and a driver printed circuit board 26. The head unit 15 selects a nozzle as a recording element to inject an ink therefrom in accordance with a drive signal (image formation signal) supplied through the corresponding power supply cable 24 while the head unit 15 is being reciprocated or driven in the forward direction. A color image is thus reproduced on the recording paper sheet 11.

The recording operation of the head unit 15 will be described hereinafter. The head unit 15 is driven by the pulse motor 17 along the main scanning direction so as to move in the forward or backward direction by one-dot intervals. More particularly, the recording heads 15Y to 15BK have nozzles Y1, Y2 and Y3, nozzles M1, M2 and M3, nozzles C1, C2 and C3, and nozzles BK1, BK2 and BK3, respectively. Now assume that the nozzle BK1 of the recording head 15BK is aligned on a main scanning line SL of the recording paper sheet 11. Upon reciprocal movement of the head unit 15, the black ink is injected onto main scanning lines SL, SL+4 and SL+8; the cyan ink is injected onto main scanning lines SL+1, SL+5 and SL+9; the magenta ink is injected onto main scanning lines SL+2, SL+6 and SL+10; and the yellow ink is injected onto main scanning lines SL+3, SL+7 and SL+11.

When forward or backward movement of the head unit 15 is completed, the recording paper sheet 11 is fed by the pulse motor 13 upward by three dots (corresponding to the number of nozzles of each of the recording heads 15Y to 15BK). The head unit 15 then reciprocates again, along a scanning line three ahead of the immediately preceding scanning line. In particular, the nozzle BK1 has moved from the main scanning line SL to the main scanning line SL+3. Other nozzles are moved in the same manner as described above. Thereafter, upon forward or backward scanning, the different color inks are injected from the nozzles at positions corresponding to the current nozzle positions.

Figure 4:
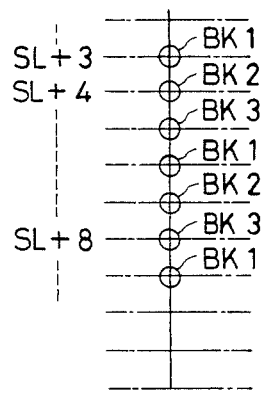
FIG. 4 shows printing positions of nozzles of a black recording head 15BK shown in FIG. 3.

Consider the operation of the recording head 15BK as shown in FIG. 3. When the 3-dot "jump" along the subscanning direction is performed, printing by the nozzles BK1 to BK3 is performed, as shown in FIG. 4. Double printing at a single position and omissions are eliminated. In general, assume that the N nozzles are aligned in line at K dot intervals along the subscanning direction and that the N nozzles inject the inks every time interval Δt. Under these assumptions, K/N must be an irreducible fraction so as to prevent double printing and omissions. In the above embodiment, as N=3, K=4, then K/N=4/3, thereby satisfying the condition that K/N be an irreducible fraction.

The recording apparatus of the present invention thus performs recording in both main scanning and subscanning directions by repeated main scanning and subscanning operations. In order to form a multicolor image, each main scanning line must be scanned with heads which inject different color inks. In the above embodiment, four scanning procedures by the heads 15Y to 15BK are required to complete a scanning cycle. Assume that a point of the $m_1$th recording head is given as $Zm_1$ on the orthogonal coordinates, and that a point of the $m_2$th recording head is given as $Zm_2$ on the coordinates. In order to scan the same position with the $m_1$th and $m_2$th recording heads, the following condition must be generally satisfied:

$$Zm_1 = Zm_2 \ (m_1 \neq m_2)$$

In the above embodiment, the nozzles Y3, BK3, C2 and M1 are operated on the main scanning line SL+11 in the order named, as shown in FIG. 3, so that the yellow, black, cyan and magenta inks overlie one another to form a multicolor image. The above operation may be applied to any other main scanning line. If points corresponding to the nozzle positions of the recording heads 15Y to 15BK are given as $Z_Y$, $Z_M$, $Z_C$ and $Z_{BK}$ on the coordinates, respectively, the following condition is given for each main scanning line as follows:

$$Z_Y = Z_M = Z_C = Z_{BK}$$

In other words, a multicolor image having the yellow, magenta, cyan and black inks overlying one another is formed on the recording paper sheet 11.

The overlying of the different color inks at a single position of the recording paper sheet 11 is performed every time the recording head is driven in the forward or backward direction. Therefore, the previously injected ink is completely dried before the next ink is injected thereon, thereby eliminating the smearing which occurs in the conventional recording apparatus.

In the case of using a reading head (not shown) which comprises a single sensor to read an image from the document, a control circuit for controlling recording with the recording head unit 15 shown in FIG. 3 will be described with reference to FIG. 5.

Figure 5:
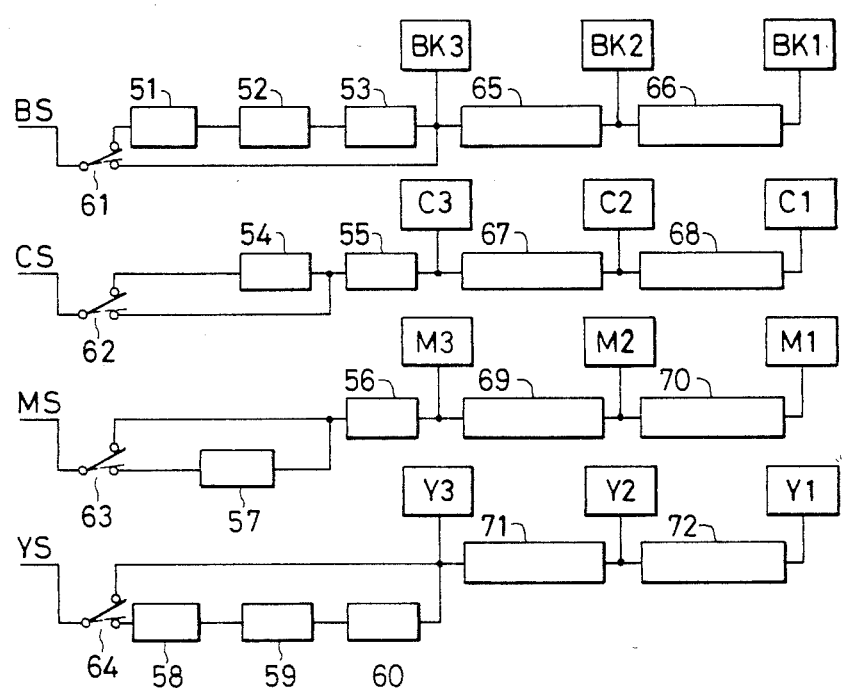
FIG. 5 is a block diagram of a control unit for driving the recording head unit shown in FIG. 3.

Referring to FIG. 5, color signals BS, CS, MS and YS which correspond to the black, cyan, magenta and yellow inks are read by the reading head (not shown). Delay circuits 51, 52 and 53 are connected in series with each other so as to receive the color signal (referred to as a black signal hereinafter) BS; delay circuits 54 and 55 are connected in series with each other so as to receive the color signal (referred to as a cyan signal hereinafter) CS; delay circuits 57 and 56 are connected in series with each other so as to receive the color signal (referred to as a magenta signal hereinafter) MS; and delay circuits 58, 59 and 60 are connected in series with each other so as to receive the color signal (referred to as a yellow signal hereinafter) YS. Switching circuits 61 to 64 are set at the positions indicated by solid lines, respectively, when the recording head unit 15 is moved in the forward direction. However, the switching circuits 61 to 64 are set at the positions indicated by dotted lines, respectively, when the recording head unit 15 is moved in the backward direction. The nozzles BK3, BK2 and BK1 are connected between the delay circuit 53 and a delay circuit 65, between the delay circuit 65 and a delay circuit 66, and to the output terminal of the delay circuit 66, respectively. The nozzles C3, C2 and C1 are connected between the delay circuit 55 and a delay circuit 67, between the delay circuit 67 and a delay circuit 68 and to the output terminal of the delay circuit 68, respectively. Similarly, the nozzles M3, M2 and M1 are connected with respect to the delay circuit 56 and delay circuits 69 and 70 in a similar manner as described above; and the nozzles Y3, Y2 and Y1 are connected with respect to the delay circuit 60 and delay circuits 71 and 72 in a similar manner as described above. Each of the delay circuits 51 to 60 serves to delay the corresponding color signal by two dots. Each of the delay circuits 65 to 72 serves to delay the corresponding color signal by four scanning lines. As a result, the H; yellow signal YS is supplied to the nozzle Y3 through the switching circuit 64. At the same time, the yellow signal YS which is delayed by the delay circuit 71 by four main scanning lines is supplied to the nozzle Y2, and the yellow signal YS which is delayed by the delay circuits 71 and 72 by eight main scanning lines is supplied to the nozzle Y1. Meanwhile, when the head unit 15 is moved in the forward direction, the magenta signal MS is supplied to the delay circuit 56 through the switching circuit 63 and is delayed by a two-dot interval. The two-dot delayed magenta signal is then supplied to the nozzle M3. The four-main scanning line delayed magenta signal MS and the eight-main scanning line delayed magenta signal MS are supplied to the nozzles M2 and M1, respectively, in the same manner as for the nozzles Y2 and Y1. The cyan signal CS is delayed by the delay circuits 54 and 55 by a total interval of four dots and supplied to the nozzle C3, and the signal is further delayed and supplied to nozzles C2 and C1. The black signal BS is then delayed by the delay circuits 51, 52 and 53 by a total interval of six dots and is supplied to the nozzle Y3. This signal is then further delayed and supplied to the nozzles Y2 and Y1.

As a result, the drive signals corresponding to the positions on the image which, in turn, correspond to the nozzles Y1 to Y3, M1 to M3, C1 to C3 and BK1 to BK3 are simultaneously supplied thereto. In this manner, color inks corresponding to the supplied color signals are sequentially injected in synchronism with the forward movement of the head unit 15, thereby forming a color image on the recording paper sheet 11. However, when the switching circuits 61 to 64 are switched to the positions indicated by the dotted lines, respectively in the backward movement of the head unit 15, the delaying operation for the nozzles is performed in the reverse order as compared with the order of the delaying operation in the forward direction. Thus, the picture image is reproduced on the recording paper sheet 11.

In the above embodiment, the conditions satisfy inequality (1). However, in a head unit operated in accordance with the following inequalities:

$$lM > K, \; K(N-1)+1 > l$$

$K/l$ must be an irreducible fraction so as to prevent double recording by the nozzle heads 15Y to 15BK in a single scanning cycle. Even in the head unit which satisfies inequality (2), the color image can be easily reproduced by reciprocal movement of the recording head unit 15. The order of overlaid color inks with respect to each main scanning line can be identical when $l$ is an integer multiple of N. In this case, the relation (3) or (4) must be satisfied:

$$\left. \begin{array}{l} lM \leq K \\ l = aN \, (a = 1, 2, 3, \ldots) \end{array} \right\} \quad (3)$$

$$\left. \begin{array}{l} lM > K \\ K(N-1) + 1 > l \\ l = aN \, (a = 1, 2, 3, \ldots) \\ \text{for } K/l: \text{ irreducible fraction} \end{array} \right\} \quad (4)$$

Figure 6:
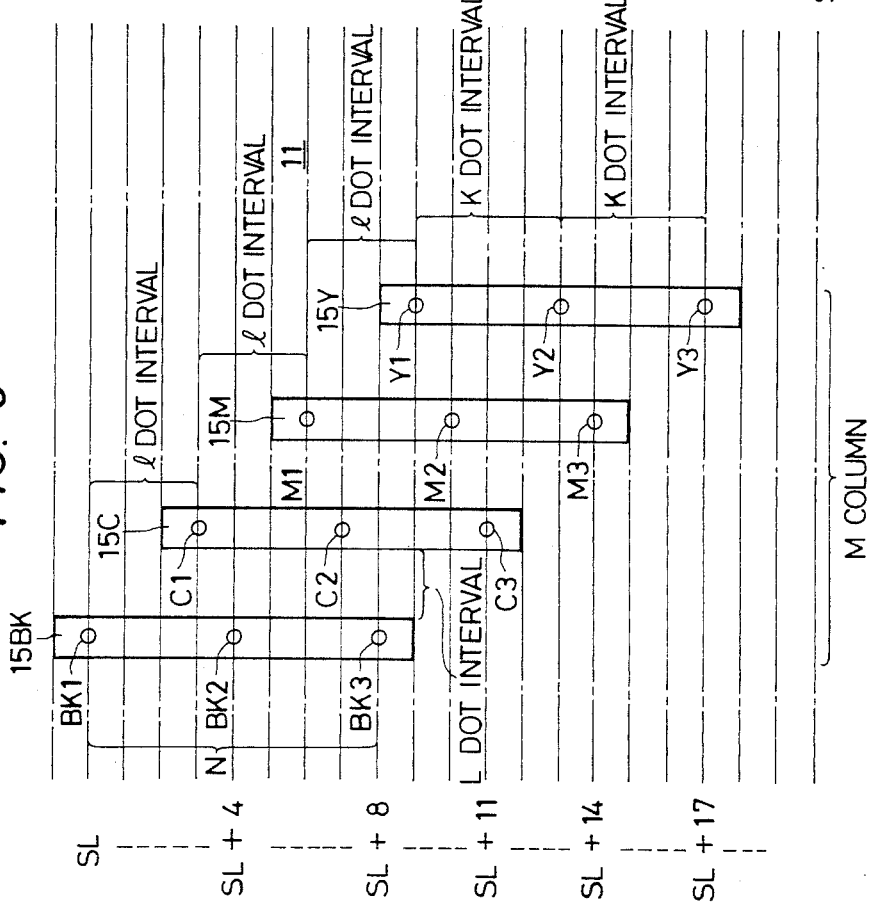
FIG. 6 shows another configuration of a recording head unit.

A modification of the construction of the recording head unit 15 is shown in FIG. 6. Each of the recording heads 15Y to 15BK has three nozzles (N=3) at 4-dot intervals (K=4) along the subscanning direction thereof (vertical direction in the figure). These recording heads 15Y, 15M, 15C and 15BK are disposed to be parallel to each other at 2-dot intervals (L=2) in the order named along the main scanning direction (left to right), such that the recording heads 15Y, 15M, 15C and 15BK are offset from each other by 3-dot intervals along the subscanning direction (upper to lower in the figure). In this embodiment, K, l, M and N are 4, 3, 4 and 3, respectively, so that $$l \cdot M = 12 > 4 = K$$

$$K(N-1) + 1 = 4 \times (3-1) + 1 = 9 > 3 = l$$

$$l = 1 \times N = 3$$

As a result, the above conditions satisfy relation (4). It should be noted that the alternate long and short dashed lines in FIG. 6 indicate main scanning lines of the recording heads 15Y to 15BK.

The recording operation of the recording head unit 15 shown in FIG. 6 will now be described. The head unit 15 is driven by the pulse motor 17 along the main scanning direction so as to move in the forward or backward direction by one-dot intervals. More particularly, the recording heads 15Y to 15BK have nozzles Y1, Y2 and Y3, nozzles M1, M2 and M3, nozzles C1, C2 and C3, and nozzles BK1, BK2 and BK3, respectively. Now assumes that the nozzle BK1 of the recording head 15BK is aligned on a main scanning line SL of the recording paper sheet 11. Upon reciprocal movement of the head unit 15, the black ink is injected onto main scanning lines SL, SL+4 and SL+8; the cyan ink is injected onto main scanning lines SL+3, SL+7 and SL+11; the magenta ink is injected onto main scanning lines SL+6, SL+10, and SL+14; and the yellow ink is injected onto main scanning lines SL+9, SL+13 and SL+17.

When forward or backward movement of the head unit 15 is completed, the recording paper sheet 11 is fed by the pulse motor 13 upward by three dots (corresponding to the number of nozzles of each of the recording heads 15Y to 15BK). The head unit 15 then reciprocates again along a scanning line three lines ahead of the immediately preceding scanning line. In particular, the nozzle BK1 on the main scanning line SL has moved to the main scanning line SL+3. Other nozzles are moved in the same manner as described above. Thereafter, upon forward or backward scanning, the different color inks are injected from the nozzles at positions corresponding to the current nozzle positions.

Figure 7:
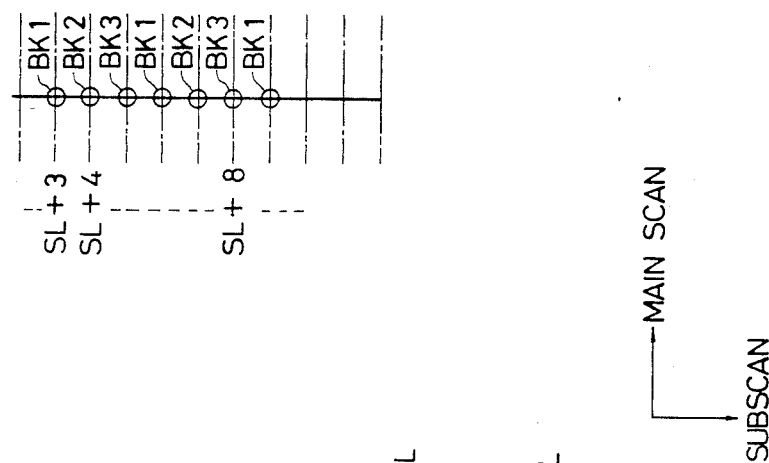
FIG. 7 shows printing positions of nozzles of a black recording head 15BK shown in FIG. 6'.

Consider the operation of the recording head 15BK as shown in FIG. 6. When the 3-dot "jump" is performed along the subscanning direction, printing by the nozzles BK1 to BK3 is performed, as shown in FIG. 7. Double printing and omissions at a single position are eliminated. In general, assume that the N nozzles are aligned in line at K-dot intervals along the subscanning direction and that the N nozzles inject the inks every time interval Δt. Under these assumptions, K/N must be an irreducible fraction so as to prevent double printing and omissions. In the above embodiment, as N=3, K=4, then K/N=4/3, thereby satisfying the condition that K/N be an irreducible fraction.

The recording apparatus of the present invention thus performs recording by repeating main scanning and subsdanning operations. In order to form a multicolor image, each main scanning line must be scanned with heads which inject different color inks. In the above embodiment, four scanning procedures by the heads 15Y to 15BK are required to complete a scanning cycle. Assume that a point of the $m_1$th recording head is given as $Zm_1$ on the orthogonal coordinates, and that a point of the $m_2$th recording head is given as $Zm_2$ on the coordinates. In order to scan the same position with the $m_1$th and $m_2$th recording heads, the following condition must be generally satisfied:

$$Zm_1 = Zm_2 \ (m_1 \neq m_2) \quad (5)$$

In the above embodiment, the nozzles Y3, M3, C3 and BK3 are operated on the main scanning line SL+17 in the order named, as shown in FIG. 6, so that the yellow, magenta, cyan and black inks overlie one another to form a multicolor image. The above operation may be applied to any other main scanning line. If points corresponding to the nozzle positions of the recording heads 15Y to 15BK are given as $Z_Y$, $Z_M$, $Z_C$ and $Z_{BK}$ on the coordinates, respectively, the following condition is given for each main scanning line as follows:

$$Z_Y = Z_M = Z_C = Z_{BK} \quad (6)$$

In the above embodiment, the order in which the heads 15BK to 15Y are driven for each scanning line is the same in both forward and backward scanning operations. As a result, the order of ink injection in forward scanning is the same as that in backward scanning. The yellow, magenta, cyan and black ions are sequentially injected onto the main scanning line SL+17. When the yellow ink is injected by the head 15Y in forward scanning, the magenta ink is then injected by the head 15M in backward scanning. During the next reciprocal movement of the head unit, the cyan and black inks are injected by the recording heads 15C and 15BK, respectively. The order of ink injection is the same in the case where the yellow ink is injected by the recording head 15Y in backward scanning. Each main scanning line is scanned to perform ink injection in the order of yellow, magenta, cyan and black inks. Therefore, according to this embodiment, no color tone difference due to a change in ink injection order may occur. For this purpose, the interval l which indicates an offset distance between two adjacent recording heads among the recording heads 15BK to 15Y must be a positive integer multiple of N (the number of nozzles). The apparatus of this embodiment is also controlled by the control circuit shown in FIG. 5.

In the above embodiment, the head unit satisfies relation (4). Furthermore, even if the head unit which satisfies relation (3) is used, double recording on a single main scanning line can be prevented by defining K/N to be an irreducible fraction. In this manner, even if the head unit which satisfies relation (3) is used, the image can be readily reproduced on the recording paper sheet 11 upon reciprocal movement of the recording head unit 15 under the control of the control circuit shown in FIG. 5.

In the recording apparatus of this embodiment for forming an image on the recording paper sheet by utilizing a dot (pixel) matrix thermal printer or ink jet printer, N nozzles are disposed at K-dot intervals along the subscanning direction. At the same time, M recording heads are disposed parallel to each other at L-dot intervals in the main scanning direction, and the M recording heads are offset from each other by l-dot intervals in the subscanning direction, thereby forming an (N×M) dot matrix. The ratio of K to N is determined to be an irreducible fraction, and at the same time one of the following two relations must be satisfied:

$$lM \leq K$$

and $$lM \leq K$$

and $$\left. \begin{array}{l} lM > K \\ K(N-1) + 1 > l \\ \text{for } K/l \text{: irreducible fraction} \end{array} \right\}$$

Furthermore, by scanning M recording heads M times, an image is formed on the recording paper sheet in accordance with M drive signals.

As a result, the above principle may be applied to a multicolor recording apparatus wherein M different color inks are injected onto the same position, in accordance with M color signals in one-to-one correspondence, such that only after the immediately previously injected ink has completely dried is the next ink injected thereon, thereby preventing the degradation (i.e., smearing) of the color inks.

Furthermore, if the printing apparatus is constructed to satisfy the equation $l = \alpha N$ ($\alpha = 1, 2, 3, \ldots$), the order of ink injection in forward scanning is the same as that in backward scanning, thereby preventing undesirable color tone differences.

A recording apparatus according to another embodiment of the present invention will be described in which M recording heads are disposed to be parallel to each other along the subscanning direction. Each recording head has N nozzles formed at K-dot intervals along the same main scanning line.

Figure 8:
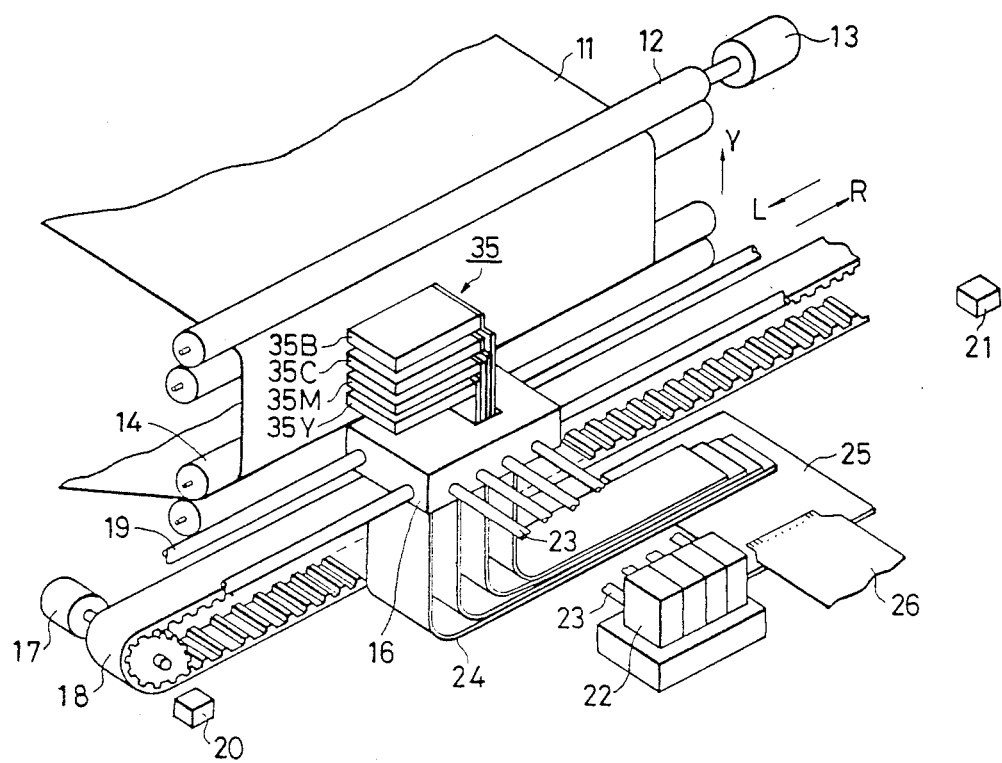
FIG. 8 is a perspective view of a recording apparatus according to another embodiment of the present invention.

FIG. 8 is a perspective view of a multicolor ink jet printer as the recording apparatus. The same reference numerals as used in FIG. 2 denote the same parts in FIG. 8.

Figure 9:
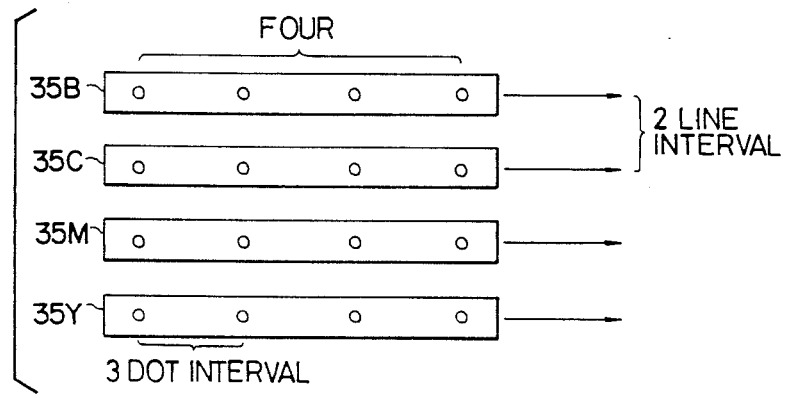
FIG. 9 shows a configuration of a recording head unit of the apparatus shown in FIG. 8.

A multinozzle ink jet recording head unit or a recording head unit 35 is moved along the width of a recording paper sheet 11. The recording head unit 35 comprises a yellow (Y) recording head 35Y, a magenta (M) recording head 35M, a cyan (C) recording head 35C, and a black (B) recording head 35B. The configuration of the recording heads 35Y to 35B is shown in FIG. 9. Each recording head has four nozzles located at 3-dot intervals along the main scanning direction (left to right). The recording heads 35Y, 35M, 35C and 35B are disposed to be parallel to each other at two-line intervals along the subscanning direction (upper to lower) in the order named. Each of the recording heads 35Y, 35M, 35C and 35B injects a corresponding ink in accordance with the on-demand system wherein an ink is injected every time a pressure pulse is applied to the recording head, or in accordance with the bubble jet system wherein a heating element is embedded in the recording head and is heated to form a bubble which allows ink injection.

Figure 10:
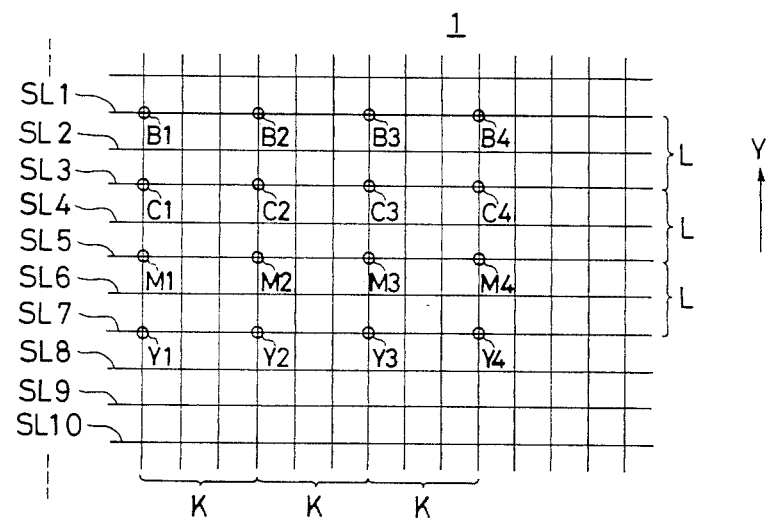
FIG. 10 shows positional relationship among the nozzles of the recording head unit shown in FIG. 9.

Assume that the recording heads 35Y, 35M, 35C and 35B are disposed with respect to the recording paper sheet 11, as shown in FIG. 9, and that the recording heads 35Y, 35M, 35C and 35B have nozzles Y1 to Y4, nozzles M1 to M4, nozzles C1 to C4, and nozzles B1 to B4, respectively, as shown in FIG. 10. The yellow, magenta, cyan and black inks are respectively injected onto the scanning lines SL7, SL5, SL3 and SL1 in forward or backward scanning. Thereafter, the pulse motor 13 is energized to feed the recording paper sheet 11 in the subscanning direction (indicated by arrow Y) by one dot. The recording heads 35Y, 35M, 35C and 35B are thus positioned on the scanning lines SL8, SL6, SL4 and SL2, respectively, and the yellow, magenta, cyan and black inks are injected onto the recording paper sheet 11 in backward or forward scanning and so on, thereby forming a color image thereon.

Consider the operation of the recording heads on the scanning line SL7. If the yellow ink is injected by the recording head 35Y by forward movement of the recording head in the first reciprocal scanning, the magenta ink is injected by the recording head 35M by forward movement of the recording head in the second reciprocal scanning. Similarly, the cyan ink is injected by the recording head 35C in the third scanning, and the black ink is injected by the recording head 35B in the fourth scanning. As a result, the yellow, magenta, cyan and black inks are sequentially injected in the order named. In the scanning line SL8 which is subject to backward scanning, the yellow, magenta, cyan and black inks are sequentially injected onto the recording paper sheet in the order named. According to this embodiment, the recording heads 35Y, 35M, 35C and 35B are sequentially driven along each scanning line irrespective of forward and backward movement of the recording head unit, thereby preventing undesirable color tone differences.

In the above embodiment, the interval between two adjacent recording heads corresponds to two scanning lines. When a one-reciprocal scanning time interval has elapsed after recording by one recording head is completed, recording is performed by the next recording head. If the interval between the two adjacent recording heads corresponds to the interval L, the next ink is injected after the first ink has completely dried, thereby preventing smearing of the injected inks.

Figure 11:
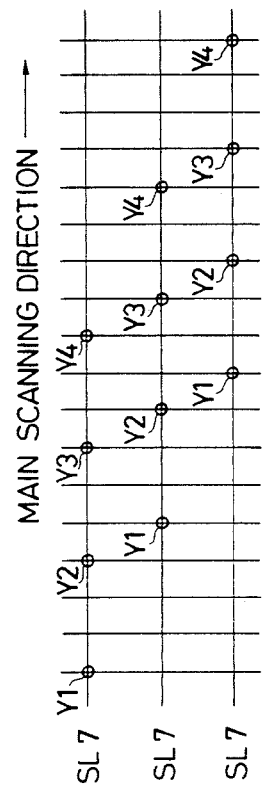
FIG. 11 is a schematic view for explaining movement of the nozzles of a yellow recording head 35Y shown in FIG. 9 along a main scanning direction.
Figure 12:
FIG. 12 shows printing positions of nozzles of the recording head 35Y shown in FIG. 9.
Figure 13:
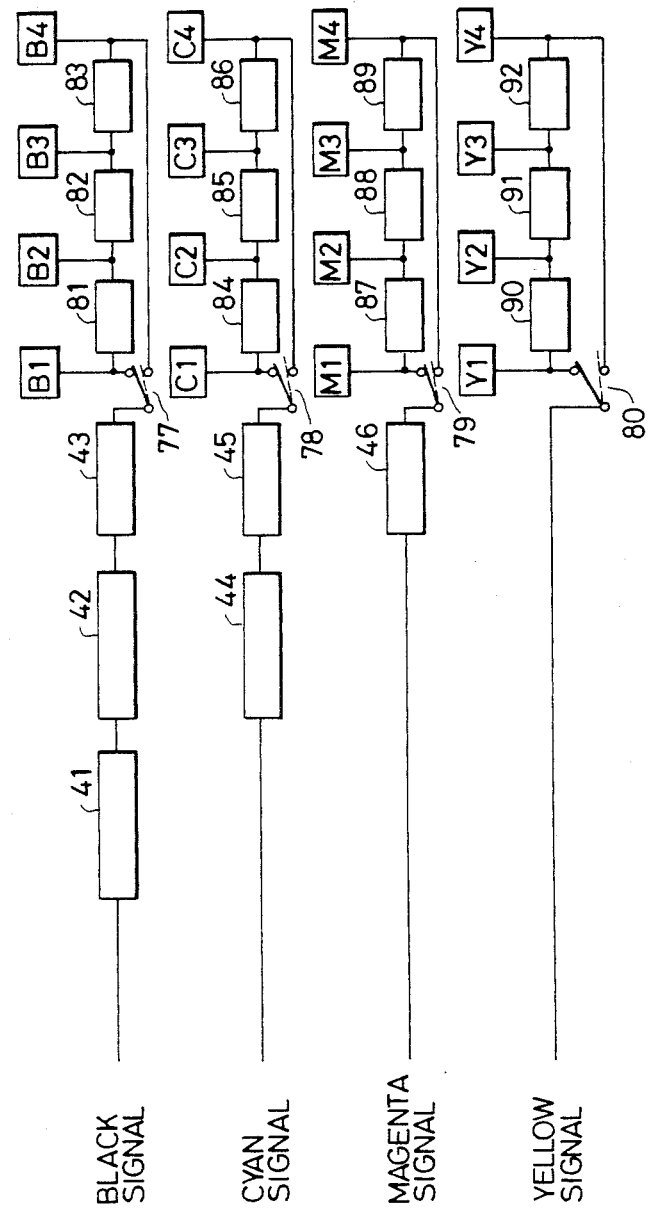
FIG. 13 is a block diagram of a control unit for driving the recording head unit shown in FIG. 9.

Forward scanning or backward scanning of the recording heads 35Y to 35B will now be described hereinafter. In this embodiment, a head feed pulse motor 17 is controlled such that the recording head unit 35 jumps along a scanning line at four-dot intervals. Consider the operation of the nozzles Y1 to Y4 of the recording head 35Y shown in FIG. 9. As shown in FIG. 11, the recording head 35Y is shifted by four-dot intervals and repeats ink injection. Therefore, recording is performed by the nozzles in the order shown in FIG. 12, thereby preventing double recording or omissions. In general, when the N nozzles are aligned in line at K-dot intervals on a given main scanning line, the condition for preventing double recording or omissions is that $K/N$ be an irreducible fraction, on the basis that N nozzles are simultaneously driven every interval $\Delta t$. In this embodiment, $N=4$ and $K=3$, so that $K/N=4/3$, to satisfy the above condition.

A control circuit for controlling a reading head (not shown) which comprises a single sensor to read the image on the recording paper sheet will be described when the image is recorded by the recording head unit 35 shown in FIG. 9.

Black, cyan, magenta and yellow signals are produced by the reading head (not shown). Delay circuits 41 to 46 comprise line memories, respectively. Switching circuits 77 to 79 are connected to the output terminals of the delay circuits 43, 45 and 46, respectively. The yellow signal is directly supplied to a switching circuit 80. The switching circuits 77 to 80 are respectively set at the positions indicated by solid lines in forward scanning. However, these switching circuits 77 to 80 are respectively set at the positions indicated by dotted lines in backward scanning. Delay circuits 81 to 83 are connected in series with each other so as to supply delayed signals to the nozzles B1 to B4 of the recording head 35B; delay circuits 84 to 86 are connected in series with each other so as to supply delayed signals to the nozzles C1 to C4 of the recording head 35C; delay circuits 87 to 89 are connected in series with each other so as to supply delayed signals to the nozzles M1 to M4 of the recording head 35M; and delay circuits 90 to 92 are connected in series with each other so as to supply delayed signals to the nozzles Y1 to Y4 of the recording head 35Y. The color signal supplied to each of the delay circuits 41 to 46 is delayed by two scanning lines. The delayed color signal supplied to each of the delay circuits 81 to 92 is delayed by a three-dot interval. For example, the yellow signal YS is supplied directly to the nozzle Y1 through the switching circuit 80 in forward scanning. The three-dot delayed yellow signal is supplied to the nozzle Y2 through the delay circuit 90. At the same time, the six-dot delayed yellow signal is supplied to the nozzle Y3 through the delay circuits 90 and 91, and the nine-dot delayed yellow signal is supplied to the nozzle Y4 through the delay circuits 90, 91 and 92. When the nozzles Y1 to Y4 are positioned on the scanning line L7, as shown in FIG. 10, the corresponding drive signals are simultaneously supplied to the nozzles Y1 to Y4.

In forward scanning, the magenta signal is delayed by the delay circuit 46 by two scanning lines, and a delayed signal is supplied directly to the nozzle M1 through the switching circuit 79. The 3-, 6- and 9-dot delayed magenta signals are respectively supplied to the nozzles M2, M3 and M4, in the same manner as for the nozzles Y2, Y3 and Y4. As a result, at the same time as the yellow signals are supplied to the corresponding nozzles Y1 to Y4, the magenta signals are supplied to the nozzles M1 to M4 which are aligned in line on the scanning line L5. Similarly, the cyan signal is delayed by the delay circuits 44 and 45 by four scanning lines, a delayed signal is supplied to the nozzle C1, and further delayed signals are then supplied to the nozzles C2 to C4. The black signal is delayed by the delay circuits 41, 42 and 43 by six scanning lines, a delayed signal is supplied to the nozzle B1, and further delayed black signals are then supplied to the nozzles B2 to B4.

As a result, the nozzles Y1 to Y4, M1 to M4, C1 to C4 and B1 to B4 receive the corresponding signals, respectively. When the ink is injected in accordance with the color signals in synchronism with the forward movement of the head unit 35, the image is reproduced on the recording sheet 11. In backward scanning, the switches 77 to 80 are set at positions indicated by the dotted lines. The delaying operation for the nozzles in backward scanning is the reverse of that in forward scanning.

As described above, in the recording apparatus for forming an image on the recording paper sheet by utilizing a dot (pixel) matrix of a thermal or ink jet printer, M printing heads are disposed parallel to each other in the subscanning direction and each printing head has N nozzles aligned in line on a single scanning line, thereby forming an (M×N) dot matrix. As a result, K/N is set to be an irreducible fraction so as not to allow the N nozzles of the single recording head to produce double recording or omissions. At the same time, M types of signal are used for scanning the M recording heads by M times so as to form an image on the recording paper sheet. When the present invention is applied to a multicolor recording apparatus for forming a color image by injecting different color inks at a single position of the recording paper sheet in accordance with a plurality of color signals, and when the interval along the subscanning direction of the matrix (i.e., the distance between the nozzles for injecting different color inks) is properly determined, the subsequent ink can be injected only after the immediately previously injected ink has completely dried, thereby preventing degradation of image quality.

According to the multicolor recording apparatus for performing recording by reciprocal movement, the nozzles for injecting the same color are aligned in line on a main scanning line. Therefore, the order of ink injection in forward scanning is the same as that in backward scanning, thereby preventing color tone differences which are caused by different orders of ink injection.

According to the present invention, high-quality recording can be performed at a high density and a high speed in accordance with the plurality of signals.

The present invention is not limited to the above embodiments. Various changes and modifications may be made within the spirit and scope of the present invention.

What I claim is:

1. Color image recording apparatus comprising a recording unit including first and second recording head groups for recording in first and second colors, respectively, each said group including N recording heads, and driving means for moving said recording unit relative to a recording medium in a main scanning direction to perform a plurality of main scans and in a subscanning direction; wherein:
    said N heads of each said group are substantially aligned in the subscanning direction at intervals of K resolution elements;
    said first group is displaced relative to said second group in the subscanning direction by at least one resolution element; and
    said driving means is adapted to provide relative movement to said recording unit and the recording medium in the subscanning direction a distance of N resolution elements for successive main scans.

2. Apparatus according to claim 1, wherein said recording means reciprocates in the main scanning direction.

3. Apparatus according to claim 2, wherein the recording medium is fed past said recording unit to perform subscanning.

4. Apparatus according to claim 3, wherein the recording medium is fed after said recording unit completes each movement along the main scanning direction.

5. Apparatus according to claim 4, wherein the recording medium is fed by a step motor.

6. Apparatus according to claim 1, wherein the ratio N/K is an irreducible fraction.

7. Apparatus according to claim 1, wherein said recording unit comprises M recording head groups arranged in M columns along the main scanning direction.

8. Apparatus according to claim 7, wherein said M recording head groups scan each main scanning line M times.

9. Apparatus according to claim 1, wherein one scanning line is scanned at least once for each of first and second colors.

10. Apparatus according to claim 1, wherein the N heads of each group are aligned in a substantially straight line in the subscanning direction.

11. Apparatus according to claim 1, wherein said recording unit comprises ink jet heads for emitting ink droplets.

* * * * *

UNITED STATES PATENT AND TRADEMARK OFFICE
CERTIFICATE OF CORRECTION

PATENT NO. : 4,540,996

DATED : September 10, 1985

INVENTOR(S) : SEIJI SAITO

It is certified that error appears in the above-identified patent and that said Letters Patent is hereby corrected as shown below:

Column 1, line 25, change "recored-" to --record- --;
line 26, change "heas" to --head--; and
line 62, delete "H;".

Column 2, line 17, change "6'" to --6;--;
line 34, "Recording" should begin new paragraph; and
line 37, "Fig. 2" should begin new paragraph.

Column 5, line 36, delete "H;".

Column 7, line 34, change "subsdanning" to --subscanning--.

Column 8, lines 47 and 48, delete entire lines.

Signed and Sealed this

Second Day of September 1986

[SEAL]

Attest:

Attesting Officer

DONALD J. QUIGG

Commissioner of Patents and Trademarks